(12) United States Patent
Paare et al.

(10) Patent No.: US 11,780,392 B2
(45) Date of Patent: Oct. 10, 2023

(54) BUMPER ARRANGEMENT

(71) Applicant: BENTELER AUTOMOBILTECHNIK GMBH, Paderborn (DE)

(72) Inventors: Mirko Paare, Paderborn (DE); Elmar Mollemeier, Delbrueck (DE)

(73) Assignee: BENTELER AUTOMOBILTECHNIK GMBH, Paderborn (DE)

(*) Notice: Subject to any disclaimer, the term of this patent is extended or adjusted under 35 U.S.C. 154(b) by 77 days.

(21) Appl. No.: 17/525,045

(22) Filed: Nov. 12, 2021

(65) Prior Publication Data
US 2022/0153215 A1     May 19, 2022

(30) Foreign Application Priority Data

Nov. 13, 2020 (DE) .......................... 102020130039.5

(51) Int. Cl.
*B60R 19/34* (2006.01)
*B60R 19/18* (2006.01)

(52) U.S. Cl.
CPC .............. *B60R 19/34* (2013.01); *B60R 19/18* (2013.01)

(58) Field of Classification Search
CPC ................................ B60R 19/18; B60R 19/34
See application file for complete search history.

(56) References Cited

U.S. PATENT DOCUMENTS

| 6,450,276 | B1 | 9/2002 | Latcau |
| 10,821,926 | B2* | 11/2020 | Garbutt .................. B60R 19/18 |
| 2010/0213742 | A1 | 8/2010 | Ritz |
| 2015/0076847 | A1 | 3/2015 | Mori |
| 2020/0231107 | A1 | 7/2020 | Guenther et al. |

FOREIGN PATENT DOCUMENTS

| DE | 112012006244 T5 | 3/2015 |
| DE | 102016123628 A1 | 6/2018 |
| DE | 102017118514 B3 | 1/2019 |
| DE | 102017124590 A1 | 4/2019 |
| EP | 1072501 A2 | 1/2001 |
| EP | 1072501 A3 | 3/2003 |

OTHER PUBLICATIONS

Office Action for German Application No. 10 2020 130 039.5 dated Jul. 22, 2021; 13pp.
Extended European Search Report for European Application No. 21207402.5 dated Mar. 18, 2022; 10pp.

* cited by examiner

*Primary Examiner* — Dennis H Redder
*Assistant Examiner* — Melissa Ann Bonifazi
(74) *Attorney, Agent, or Firm* — HAUPTMAN HAM, LLP

(57) ABSTRACT

A bumper arrangement for a motor vehicle has a crossmember which can be coupled to the motor vehicle via crash boxes and is produced as a press-formed component of the same material and in one piece therewith, with a top-hat-shaped cross section. The crossmember is designed in a respective end region to run with an orientation obliquely downwards with respect to the vertical direction of the motor vehicle, and the end region is of ring-shaped design.

11 Claims, 5 Drawing Sheets

BUMPER ARRANGEMENT

RELATED APPLICATION(S)

The present application claims priority of German Application Number 10 2020 130 039.5, filed Nov. 13, 2020, the disclosure of which is hereby incorporated by reference herein in its entirety.

FIELD

The present disclosure relates to a bumper arrangement on a motor vehicle.

BACKGROUND

Motor vehicles have bumper arrangements at the front and end. In the event of a vehicle crash or a collision or even an impact against an object, two tasks are carried out by such a bumper arrangement. Firstly, there is a crossmember. The crossmember is sufficiently rigid and prevents a corresponding object or a motor vehicle from penetrating to too great an extent into the front or end region. Consequently, a possibly punctiform impact, for example against a post, is transmitted by the crossmember to a large portion of the motor vehicle width.

A second task which is carried out by a bumper arrangement is to convert crash energy into deformation work and to thereby correspondingly reduce the impact energy. For this purpose, a respective crossmember is coupled to the motor vehicle via crash boxes. For this purpose, the crash boxes are arranged between a central region and an end region of the crossmember, with respect to the transverse direction of the motor vehicle, and, consequently, with respect to the width of the motor vehicle, are each arranged between a third and a quarter of the length in the outer region of the crossmember. The crash boxes are then generally coupled to longitudinal members of the motor vehicle. In the event of an impact, the crash boxes fold, for example, in the manner of a concertina and thus convert crash energy into deformation work.

SUMMARY

An object of the present disclosure is to provide a bumper arrangement which, in the event of penetration of an impacting object or motor vehicle, brings about an even distribution so as to reduce peaks both in the specific vehicle and in a barrier.

The previously mentioned object is achieved according to the disclosure by a bumper arrangement for a motor vehicle.

The present disclosure has a bumper arrangement for a motor vehicle. In this case, a crossmember extends substantially over a large portion of the motor vehicle width. Such a crossmember is mounted in the front and/or rear region of the motor vehicle. The crossmember itself is coupled to the motor vehicle via crash boxes. This takes place at the respective end sides of longitudinal members on the motor vehicle. The crossmember itself is designed as a press-formed component of the same material and in one piece. The latter, in cross section, has a top-hat shape, consequently a top-hat-shaped cross section. For this purpose, the component is formed from a high-strength steel having a tensile strength of more than 1200 MPa, or more than 1300 MPa. The crossmember is produced as a hot-formed and press-hardened component.

According to the disclosure, the crossmember is designed in a respective end region in the transverse direction of the motor vehicle preferably to run with an orientation obliquely downwards with respect to the vertical direction of the motor vehicle. In addition, the end region is of ring-shaped design. Ring-shaped here means not inevitably round in a circular form. The end region may also involve a square ring shape. However, this specifically does not prevent the end region, consequently an outer part of the ring-shaped arrangement, from furthermore optionally being designed according to the disclosure to run with an orientation obliquely downwards.

The effect achieved by this measure according to the disclosure is that the crossmember itself is firstly mounted at a high level such that, for example in a bump-to-bumper test, a sufficient overlap is achieved, with respect to the vertical direction of the motor vehicle, with another crossmember of a colliding vehicle. At the same time, however, in the event of deformation in the longitudinal direction of the motor vehicle, the end region strikes against a wheelhouse or wheel located behind the end region and is additionally supported here. A further moment of resistance in the longitudinal direction of the motor vehicle therefore takes place via the wheel or the wheel suspension itself. In the event of a crash of high intensity, the wheel would be supported on the sill which in turn is located behind the wheel in the longitudinal direction of the motor vehicle. Therefore, a further load path is achieved next to the longitudinal member and thus better protection of the passenger compartment realized. By means of the crossmember having an orientation running obliquely downwards, the crossmember strikes as centrally as possible against the wheel located behind the crossmember or is supported on the wheel in such a manner that engagement takes place below the wheel, with respect to the vertical direction, and thus specifically jacking up or upwardly directed sliding away is prevented.

So that the crossmember itself has a high level of rigidity, the cross section of the crossmember is of top-hat-shaped design. The cross section of the crossmember also for the most part has a profiled design, a U-shaped, or top-hat-shaped design, in the ring-shaped region. The crossmember therefore has a high level of rigidity against deformation in the longitudinal direction of the motor vehicle. The crossmember can also be of double top-hat-shaped design in the cross section itself.

The opening of the top-hat shape has an orientation facing forwards or facing away from the motor vehicle with respect to the longitudinal direction. In the event of deformation in the direction of the wheelhouse, the rear side of the top-hat shape strikes, with a rounded contour, against the wheel located behind the top-hat shape. Destruction of the tire is thereby reliably prevented.

Furthermore preferably, it is provided that the region of ring-shaped design is arranged in a manner facing downwards or offset downwards with respect to the vertical direction of the motor vehicle in relation to the actual part of the crossmember. However, an upper side of the ring-shaped region is an integral part of the crossmember. The ring-shaped region has a recess in its center.

The actual end region or the outer end of the crossmember is of widened design in its cross section. This also provides a larger supporting surface on the wheelhouse or tire located behind the crossmember.

Widened in its cross section means firstly that a larger cross-sectional area is provided by the ring shape itself. However, widened in cross section can also mean that the cross-sectional width or cross-sectional height itself is of larger design, i.e. is of a wider design, in relation to a central portion and therefore a greater cross-sectional area is available because of this widening. This would then again be supplementary to the cross-sectional enlargement because of the ring shape. Overall, a greater impact surface is thus provided, in particular in comparison to a simple through crossmember without a ring shape.

A part of the ring-shaped region running downwards is preferably arranged below a connection of a crash box. This in turn achieves better support during a laterally offset impact.

This can be increased in that the two outer annular regions are additionally connected to one another by an auxiliary crossmember. The auxiliary crossmember is arranged offset substantially parallel below the actual crossmember.

The arrangement of a second pair of crash boxes or longitudinal members below the abovementioned crash boxes with respect to the vertical direction of the motor vehicle is possible according to the disclosure, wherein said first crash boxes form a further lower load path and can be fastened in the lower part of the end region of the crossmember.

The crossmember itself has in top view a profile curved arcuately about the vertical axis of the motor vehicle. The end regions are provided with a greater curvature in relation to a central region.

BRIEF DESCRIPTION OF THE DRAWINGS

The following description relates to further features, properties and aspects of the present disclosure. Embodiments are described in greater detail below with reference to the figures. The latter are used for easy understanding of the disclosure. In the figures.

DETAILED DESCRIPTION

In the figures, the same reference signs are used for identical or similar components although a repeated description is omitted for reasons of simplicity.

Figure 1:
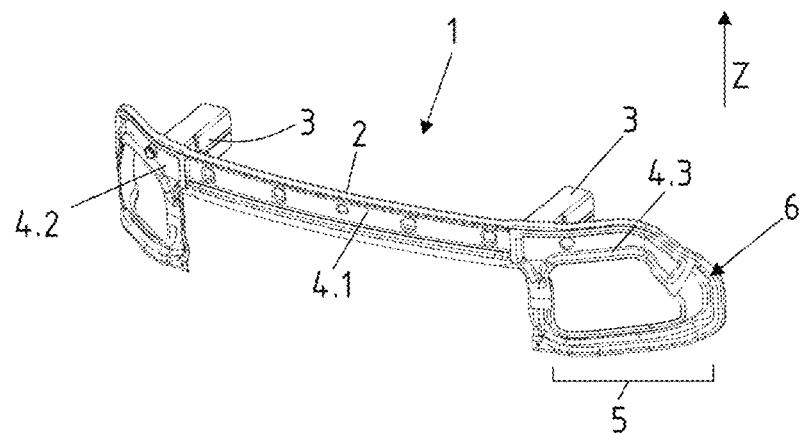
FIG. 1 shows a perspective illustration of the bumper arrangement according to at least one embodiment of the disclosure from the front.

FIG. 1 shows a bumper arrangement 1 according to the disclosure from the front. A crossmember 2 which extends substantially over the width of a motor vehicle located behind it, not illustrated specifically, can be seen. The crossmember 2 is coupled to the motor vehicle with crash boxes 3 being incorporated. A multi-part closing panel 4 (4.1, 4.2, 4.3) is arranged on the front side of the crossmember 2. According to the disclosure, the crossmember 2 is distinguished in that the crossmember 2 has a portion of ring-shaped design in a respective end region 5. Ring-shaped here means a substantially square ring-shaped portion. In addition, a part of the end portion 6 of the crossmember 2 is designed to run obliquely downwards with respect to the vertical direction Z of the motor vehicle.

Figure 2:
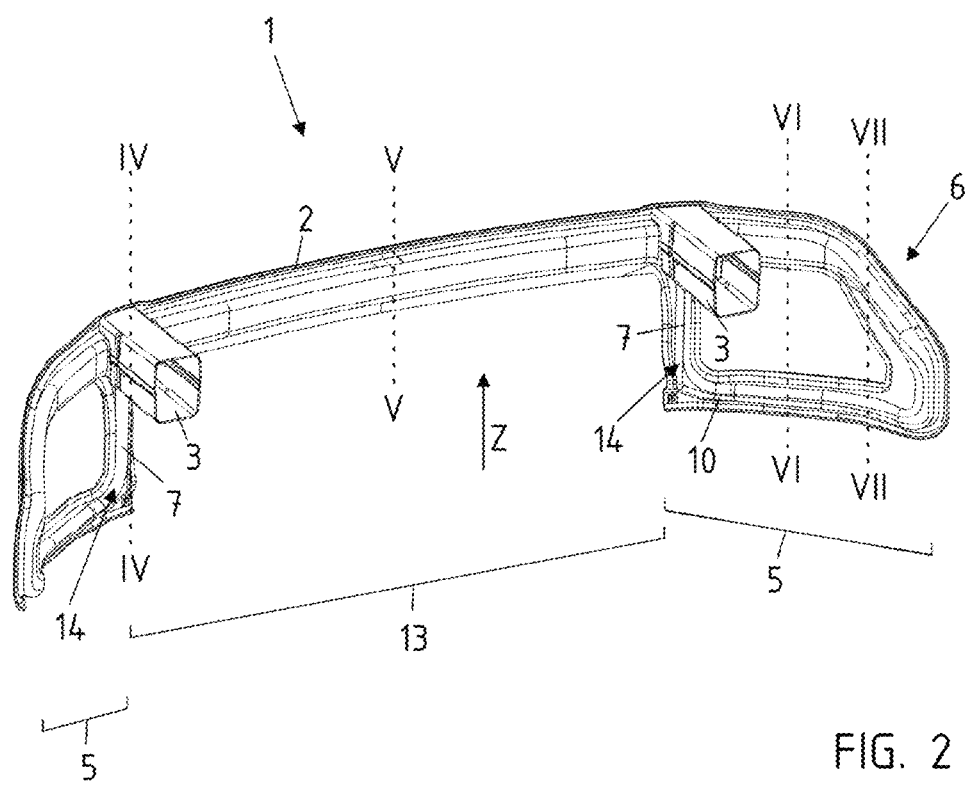
FIG. 2 shows a perspective view of the bumper arrangement from the rear according to at least one embodiment of the disclosure.

FIG. 2 shows a perspective view of the bumper arrangement 1 from the rear. The crossmember 2 itself is formed in one piece therewith and of the same material. The crossmember 2 has a top-hat-shaped profile cross section 8. The top-hat-shaped profile cross section 8 is also formed in each case in the ring-shaped end region 5 over the entire ring shape. The ring-shaped portion in the end region 5 is formed below the actual crossmember 2 itself with respect to the vertical direction Z of the motor vehicle. The portion 6 itself is arranged to run obliquely downwards with respect to the vertical direction Z of the motor vehicle. Furthermore, there is a central portion 13. There is a lower connecting region 14 for optionally present further crash boxes not illustrated specifically.

Figure 3:
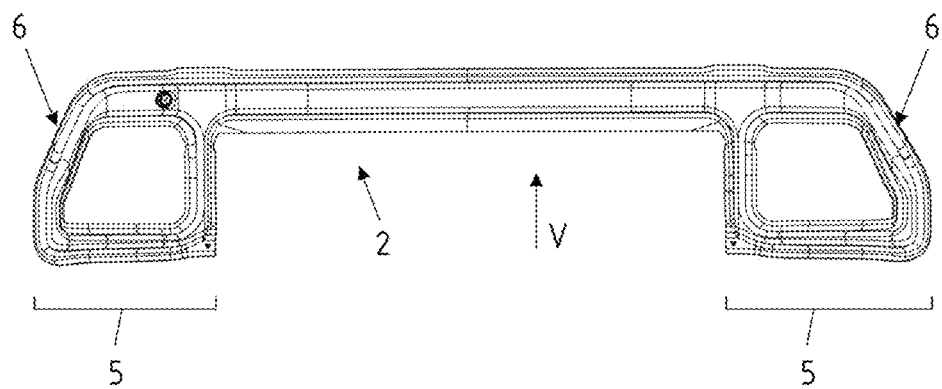
FIG. 3 shows a rear view of the crossmember according to at least one embodiment of the disclosure.

FIG. 3 shows a rear view of the crossmember 2 which likewise once again the portion 6 running obliquely downwards is shown in the outer end region 5. Furthermore, the ring-shaped portion is formed below the actual main crossmember with respect to the vertical direction Z of the motor vehicle.

As can likewise also be seen in FIG. 2, a part 7 of the ring-shaped portion which runs with an orientation downwards is arranged below a connecting region of a crash box 3.

FIG. 4 to FIG. 7 show various cross-sectional views according to the intersecting lines IV-IV to VII-VII from FIG. 2.

Figure 4:
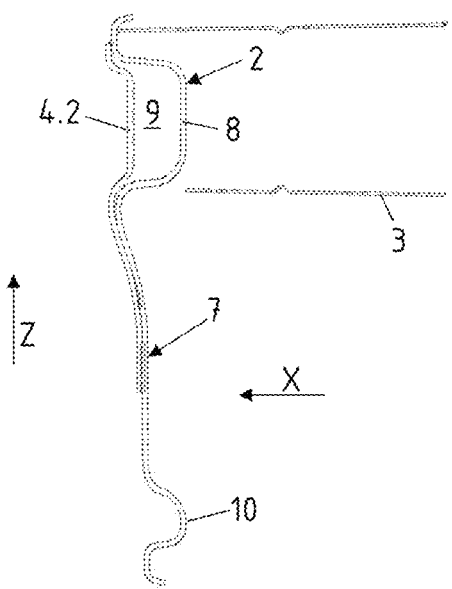
FIG. 4 to FIG. 7 show cross-sectional views of the intersecting lines from FIG. 2 according to at least one embodiment of the disclosure.

FIG. 4 shows a corresponding cross-sectional view of the intersecting line IV-IV from FIG. 2. The crash box 3 can be seen here, as can the rearwardly formed top-hat-shaped profile 8 of the crossmember 2. An opening 9 is arranged with an orientation forwards with respect to the longitudinal direction X of the motor vehicle. However, the opening 9 is closed here by a closing panel 4. The closing panel 4 extends here not only over the opening 9 but also over a part 7 of the crossmember 2 or of the ring-shaped end portion which runs with an orientation downwards. A lower part 10 of the ring-shaped region 5 likewise has a top-hat-shaped profile. The crossmember 2 itself has, according to FIG. 5, intersecting line V-V, a top-hat-shape profile 8 and the centrally arranged closing panel 4. The opening 9 is formed with an orientation forwards with respect to the longitudinal direction X of the motor vehicle.

According to intersecting line VI-VI, the lower part and the upper part of the crossmember are each of top-hat-shape design. The closing panel 4, as illustrated, can have recesses, for example for saving on weight and/or for connecting a towing lug, not illustrated specifically.

Figure 7:
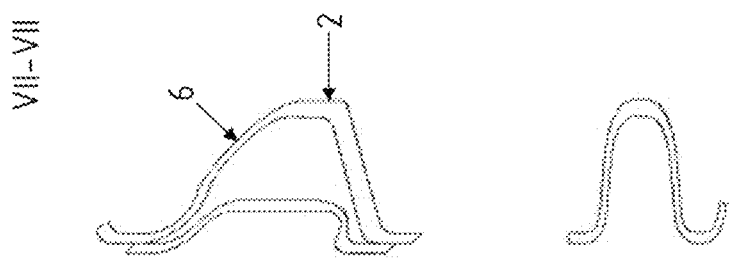
Figure 6:
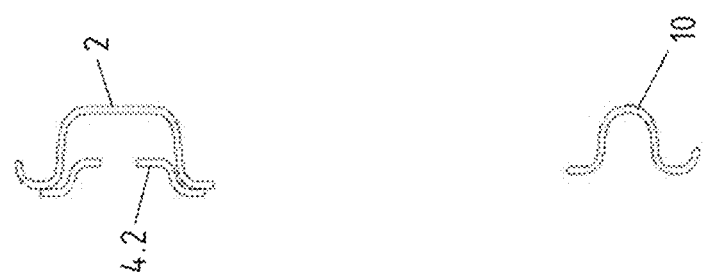
Figure 5:
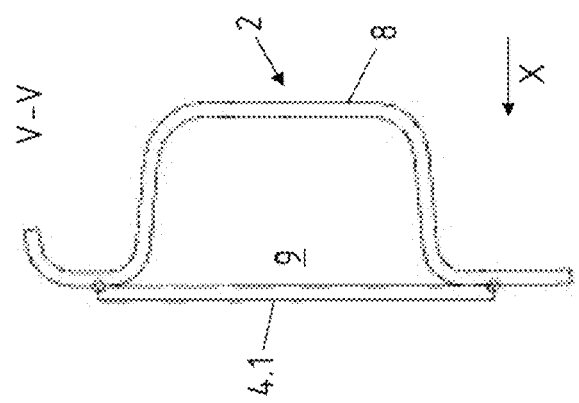

According to FIG. 7, the intersecting line VII-VII is then illustrated. The part running obliquely downwards is formed here. At the same time, the cross-sectional area of the crossmember 2 is enlarged in this region.

Figure 8:
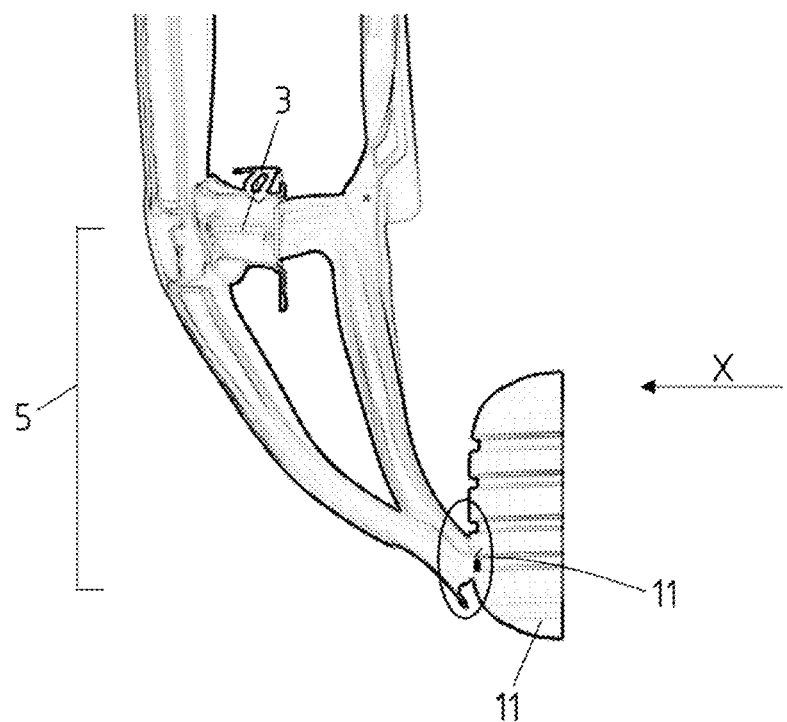
FIG. 8 shows a crash scenario with deformation in the longitudinal direction in a view from above according to at least one embodiment of the disclosure.

The effect achieved by this is illustrated in FIG. 8. In the event of a deformation in the X direction of the motor vehicle, a rear side of the crossmember 2 or of the end region 5 of ring-shaped design strikes against a wheel 11 located behind it in the longitudinal direction X of the motor vehicle and is supported on said wheel 11. A wheelhouse, not illustrated specifically, can be incorporated. By this means, a second load path is formed via the wheel 11 and not only via the crash box 3 which is already deformed. Owing to the fact that the end region 5 runs obliquely downwards with respect to the vertical direction Z of the motor vehicle, said end region strikes at the height of a wheel center point or below the latter with respect to the vertical direction Z of the motor vehicle. Jacking up or sliding over the wheel 11 is likewise reliably avoided by this means. At the same time, the end region 5 is designed protruding over the crash boxes 3 and the longitudinal member to such an extent that there is a sufficient overlap with the wheel surface or the wheel width, as viewed in the transverse direction of the vehicle.

Figure 9:
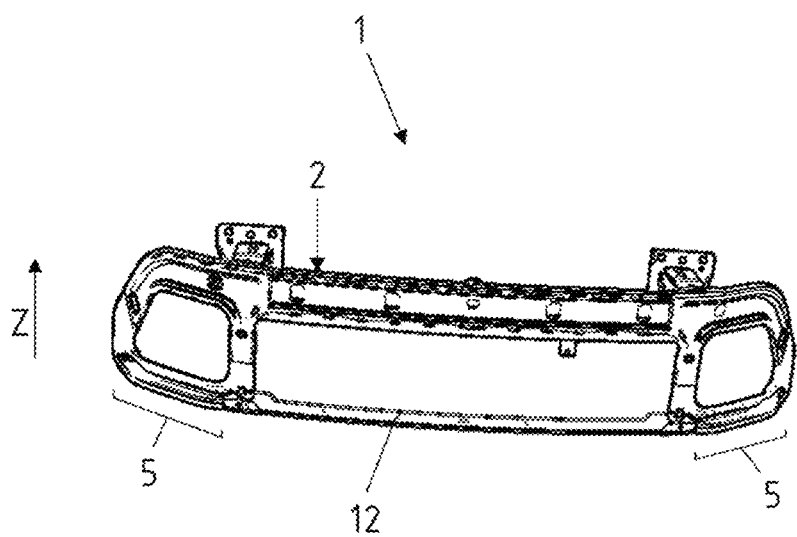
FIG. 9 shows an arrangement with an auxiliary crossmember according to at least one embodiment of the disclosure.

FIG. 9 shows a further embodiment variant of the bumper arrangement 1 according to the disclosure. An auxiliary crossmember 12 which is formed below the actual crossmember 2 with respect to the vertical direction Z of the motor vehicle is arranged here. Said auxiliary crossmember 12 connects the two end regions 5 of ring-shaped design to one another.

The crossmember 2 itself, but exclusively, or the auxiliary crossmember 12 is formed from a steel material, such as from a heat-formable and press-hardenable steel. With the bumper arrangement 1 according to the disclosure, the number of components can be reduced, taking the closing panel 4 into consideration, and at the same time the crash performance can be significantly increased, while reducing the dead weight of the entire bumper arrangement 1. The coated or else uncoated material can be used. Each press-formed component, consequently the crossmember 2 and the closing panels 4 and also the auxiliary crossmember 12 are formed from a material of the same thickness, consequently a uniform material thickness per se. However, closing panel 4, crossmember 4 and auxiliary crossmember 12 may have material thicknesses differing from one another. The dead weight can therefore likewise be efficiently reduced by targeted use of material, but at the same time the rigidity and crash performance can be increased.

Figure 10:
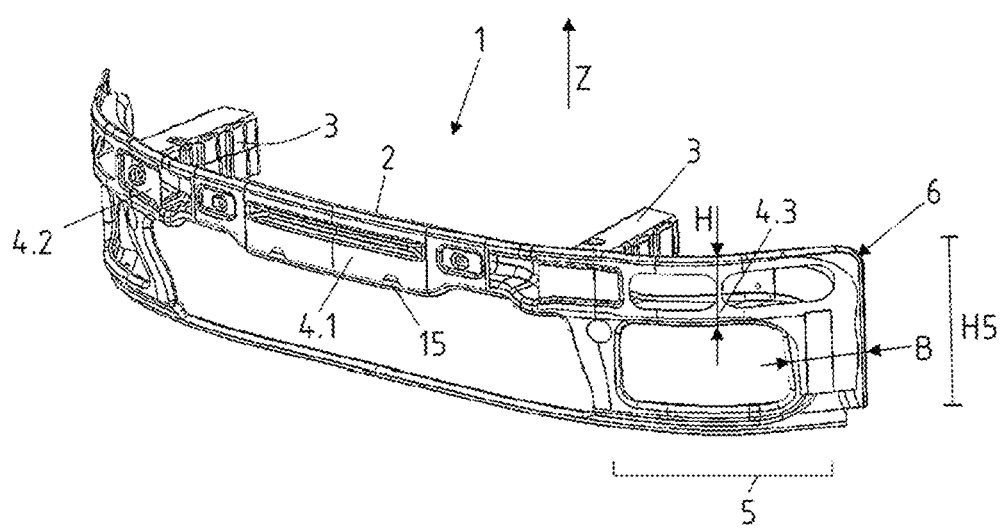
FIG. 10 shows an alternative embodiment variant of the bumper arrangement according to at least one embodiment of the disclosure.

FIG. 10 shows an alternative embodiment variant of a bumper arrangement 1 according to the disclosure.

In the central portion 13, a region 15 formed downwards with respect to the vertical direction Z of the motor vehicle is illustrated in the crossmember 2. The crash requirement of a bumper to bumper test is met by this offset or region 15 formed downwards.

A ring-shaped region is formed in each of the outer end regions 5.

Furthermore, there is an auxiliary crossmember. The ring-shaped region is also designed with an orientation downwards with respect to the vertical direction Z of the motor vehicle, with reference to the crossmember 2 itself. The closing panels 4 (4.1, 4.2, 4.3) have openings at the front.

The cross-sectional area owing to the width B there is designed to be at least identical to or enlarged with respect to the height of the cross-sectional area H in the end portion.

The ring-shaped region is offset downwards with respect to the vertical direction Z of the motor vehicle in the respective end portion of the crossmember 2 itself. That is to say, the upper part of the ring-shaped region 15 is arranged level with the crossmember 2. The ring-shaped region adjoining the latter is arranged with an orientation downwards with respect to the vertical direction Z of the motor vehicle.

A common feature of all of the exemplary embodiments is that in the cross section 2 is itself profiled in the ring-shaped region 15 of the actual crossmember 2, which is in turn produced as a uniform, one-piece press-formed part. In the simplest case, this is a U-shaped profiling. The top-hat-shaped cross section of the crossmember also continues here throughout the entire ring-shaped region. A high degree of rigidity is thereby achieved.

The overall height H5 of the end portion is at least 50%, 100%, or 150% larger than the height H of the crossmember itself. The height H is more than 90 mm, or greater than 100 mm. The height H5 in the ring-shaped region is between 200 mm and 400 mm.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A bumper arrangement for a motor vehicle, the bumper arrangement comprising:
   a crossmember; and
   crash boxes coupled to the crossmember and configured to couple the crossmember to the motor vehicle,
   wherein the crossmember is a press-formed integral component, the crossmember having
   a central portion, and
   end regions that are ring-shaped and arranged at opposite ends of the central portion, and
   wherein the end regions are arranged in a downward orientation with respect to the central portion in a vertical direction of the motor vehicle,
   each of the end regions has a part that extends in the downward orientation with respect to the vertical direction of the motor vehicle, and is arranged below connections of the crash boxes to the crossmember.

2. The bumper arrangement according to claim 1, wherein
   the crossmember has a cross-section of a top-hat-shaped profile, and
   the top-hat-shaped profile has an opening facing forwards with respect to a longitudinal direction of the motor vehicle.

3. The bumper arrangement according to claim 1, wherein the end regions of the crossmember extend obliquely in the downward orientation with respect to the vertical direction of the motor vehicle.

4. The bumper arrangement according to claim 1, wherein the crossmember, in the end regions, has a cross-section of a U-shaped profile.

5. The bumper arrangement according to claim 1, wherein the end regions have a cross-sectional area greater than a cross-sectional area of the central portion of the crossmember.

6. The bumper arrangement according to claim 1, further comprising:
   an auxiliary crossmember arranged below the crossmember,
   wherein the end regions are connected to one another by the auxiliary crossmember.

7. The bumper arrangement according to claim 2, further comprising:
   a closing panel,
   wherein the closing panel comprises multiple sections, and wherein the multiple sections are arranged on the crossmember and at least partially close the opening of the cross-section.

8. The bumper arrangement according to claim 1, wherein the end regions have an outer side, and
the outer side is arranged in front of a wheel surface of a wheel of the motor vehicle with respect to a transverse direction of the motor vehicle such that, when the crossmember is deformed in the longitudinal direction of the motor vehicle, a rear side of the crossmember is supported on the wheel surface of the wheel.

9. The bumper arrangement according to claim 1, wherein, in a top view along the vertical direction of the motor vehicle, the crossmember has a curved profile and the end regions have an arcuate curvature.

10. The bumper arrangement according to claim 1, wherein, in a top view along the vertical direction of the motor vehicle, the crossmember has a curved profile and the end regions are angled with respect to the central portion of the crossmember.

11. The bumper arrangement according to claim 1, wherein the crossmember, in the end regions, has a cross-section of a top-hat-shaped profile.

* * * * *